Patented July 14, 1925.

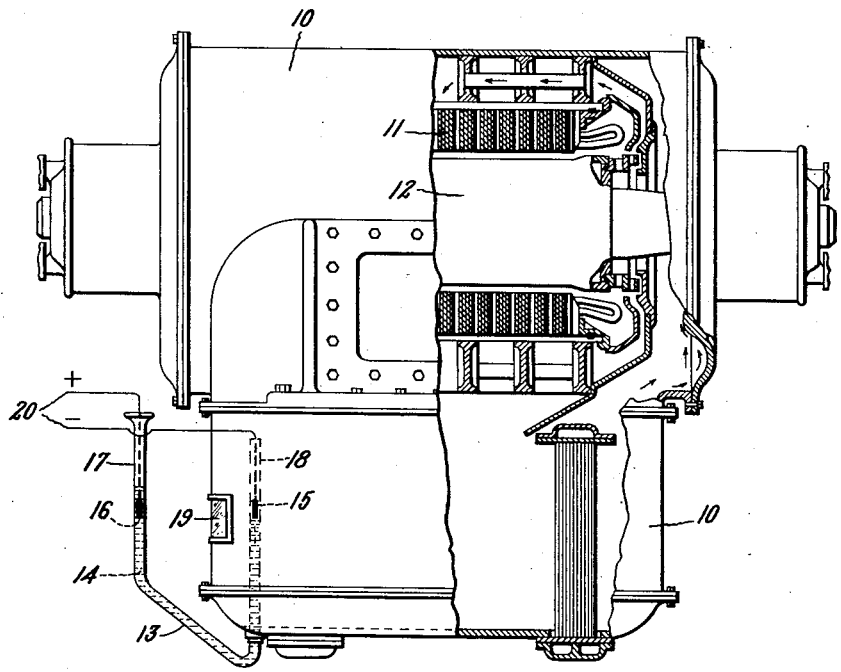

1,546,234

UNITED STATES PATENT OFFICE.

ROBERT HANNAH, OF SCHENECTADY, NEW YORK, ASSIGNOR TO GENERAL ELECTRIC COMPANY, A CORPORATION OF NEW YORK.

ELECTRICAL APPARATUS.

Application filed December 15, 1923. Serial No. 680,990.

*To all whom it may concern:*

Be it known that I, ROBERT HANNAH, a citizen of the United States, residing at Schenectady, in the county of Schenectady, State of New York, have invented certain new and useful Improvements in Electrical Apparatus, of which the following is a specification.

My invention relates to electrical apparatus in which a gas lighter than air, such as hydrogen, is circulated and recirculated for the purpose of cooling or protecting the same, and more particularly it relates to a means for automatically generating and maintaining the pressure of the gas within said apparatus substantially constant.

The object of my invention is to provide a new and novel arrangement whereby the pressure of said gas within the apparatus is automatically maintained substantially constant, and at least slightly above atmospheric pressure.

When any of the gases lighter than air, such as hydrogen, are used in electrical apparatus, it is desirable to maintain a pressure within the enclosing means at least slightly above atmospheric pressure. One of the reasons for this is to insure against the possibility of the surrounding air entering the enclosing means and impairing the heat conducting or protective property of the gas. If the gas is maintained in the enclosing means at a higher pressure than the surrounding atmosphere, it will be seen that should any leaks develop in the enclosing means the gas will, by reason of its higher pressure, leak out of the enclosure and thus prevent any of the surrounding air entering through the leaking places. The principal difficulty in maintaining the pressure of the gas within the apparatus above atmospheric pressure is in providing an enclosing means sufficiently tight to retain the gas. This difficulty is exaggerated by the fact that the lighter gases, such as hydrogen, due to their low viscosity, will leak through a very small opening. In fact, it is known that hydrogen gas will leak through the pores of an iron casting unless steps are taken to seal the pores. To overcome these difficulties I provide means which will automatically maintain the gas within the apparatus at a predetermined pressure irrespective of whether or not the enclosing means leaks.

In accordance with my invention, I provide a means in the form of a gas generator, which will operate automatically in response to changes in the pressure of the gas within the enclosing means to generate sufficient gas to compensate for any leakage, which might occur, and thus maintain the gas at a predetermined pressure within the enclosing means. This generator, in operation, will generate gas when the pressure is below a predetermined value and cease to generate when the pressure of the gas exceeds this predetermined value. With such an arrangement, I am able to maintain the pressure of the gas within the enclosing means substantially constant, and if necessary, compensate for any leakage of the gas from the apparatus.

My invention will be best understood in connection with the accompanying drawing, which illustrates one of the various forms and applications in which it may be embodied, and in which, the single figure is a side elevation of a dynamo electric machine having an enclosing casing and passages for the circulation and recirculation of a cooling gas.

In the drawing a dynamo electric machine is shown having an enclosing casing 10 surrounding its stator 11 and rotor 12 for retaining a cooling gas, such as hydrogen. Associated with the casing 10 is a gas generator which in the present embodiment of my invention comprises a U-tube 13, an electrolyte 14, a cathode 15, and an anode 16. The tube 13 has an anode leg 17 and a cathode leg 18. The cathode leg 18 of the U-tube 13 is shown in the drawing as projecting into the casing 10. This arrangement is not necessary, however, as the gas from the gas generator could be conducted to the casing 10 by means of suitable pipes. The electrolyte 14 can be any suitable liquid which will give off the desired gas when electrolytically dissociated. In the present case, water slightly acidulated with sulphuric acid is used to produce hydrogen. The cathode 15 is composed of platinum or carbon and is suspended in the casing end 18 of the U-tube 13 in contact with electrolyte 14. The anode 16 is composed of zinc or zinc amalgamated with mercury and is suspended in the opposite end 17 of the U-tube 13 and is also in contact with electrolyte 14. The cathode 15 and anode 16 are connected to a suitable source of electric current by conductors 20, which supply current to the gas generator when the electrolyte is in contact with both the cathode 15 and the anode 16. As the pressure of the gas within the casing 10 increases or decreases, the electrolyte 14 will move in the U-tube 13 to make and break contact with the cathode 15. By this arrangement the operation of the gas generator is automatically controlled in response to the pressure existing in the enclosing casing 10.

In order to insure that the gas generator functions properly to maintain the pressure of the gas within the casing 10 above atmospheric pressure, the height of the electrolyte 14 in the anode leg 17 of the U-tube should be maintained slightly above the level of the lower end of the cathode 15. This excess, or head, of liquid in the anode leg 17 of the U-tube will then act hydrostatically against the pressure of the gas within the casing 10 to cause the electroylyte 14 to make contact with the cathode 15. The pressure at which the gas generator will function, can be varied by changing the hydrostatic head of the electrolyte 14 in the anode leg 17 of the U-tube 13.

By placing a window 19 in the side of the casing 10 adjacent to the cathode leg 18 of the U-tube 13, observations can be made to determine the pressure of the gas within the casing, the difference in the levels of the electrolyte in the respective legs of the U-tube 13 representing the difference in pressure within the casing 10 and the atmosphere. Another way to accomplish the above object would be to locate both legs of the U-tube 13 outside of the casing 10, and extend the upper end of the cathode leg 18 into the casing. If so located the upper end of the cathode leg 18 should extend into the casing 10 at a point above the cathode 15.

The operation of the present embodiment of my invention may be explained as follows: Assume that the dynamo electric machine is operating with the cooling gas at a pressure at least slightly above that of the atmosphere. Under these conditions the electrolyte 14 will be maintained in the position shown in the drawing, the difference in level of the electrolyte in the legs of the U-tube 13 representing the difference in pressure between the inside of the casing and the surrounding atmosphere. As long as the electrolyte 14 remains in the positions shown, out of contact with the cathode 15, and the pressure within the casing 10 remains constant, no gas will be liberated from the electrolyte 14. If, however, a reduction in the pressure of the cooling gas, within the casing should occur for any reason, as for instance, a leak in the casing, the electrolyte 14 will assume a new position in the U-tube 13. The electrolyte 14 will then come into contact with the cathode 15, close the circuit of conductors 20, and current will flow through the electrolyte and cause gas to be liberated therefrom. This liberation of gas at the cathode will continue until sufficient gas has been liberated from the electrolyte 14 to raise the pressure within the casing to a value which will maintain the electrolyte 14 out of contact with the cathode 15. By properly proportioning the legs of the U-tube 13, the size of the cathode 15 and the anode 16, the gas generator can be made to take care of all reasonable leakage which is likely to occur in a casing of the above type. The capacity of the generator can also be increased by mounting a number of electrodes in parallel in each leg of the U-tube 13. The range of pressure at which the generator will function can also be varied by changing the relative position of the cathode 15 and anode 16 as by increasing or decreasing the difference in the levels of the electrolyte 14 in the legs of the U-tube 13.

While I have shown and described a generator of the electrolytic type, I desire to have it understood that any chemical generator might be used. Such a generator might be provided by replacing the electrolyte 14 with water or other suitable solution and suspending a suitable gas liberating element such as sodium or potassium in the cathode end of the U-tube 13.

If the generator is of the chemical type as suggested above the operation will be the same, except that when the pressure within the casing is reduced due to a leak or the like, the water or other solution within the U-tube 13 will rise in the inner leg and move into contact with the chemical element suspended therein and a chemical reaction will take place by which gas will be liberated.

From the foregoing description taken in connection with the accompanying drawing, the novel features and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made, when desired, as fall within the scope of the appended claims.

What I claim as new and desire to secure by Letters Patent of the United States, is:—

1. In combination, electrical apparatus having a casing surrounding said apparatus, said casing containing a gas lighter than air for cooling said apparatus, and means responsive to the pressure within said casing for generating said gas and supplying it to said casing.

2. In combination, electrical apparatus having a casing surrounding said apparatus, said casing containing a gas lighter than air for cooling said apparatus, and means responsive to the pressure within said casing for generating gas therein and maintaining the pressure of said gas substantially constant and at least slightly above atmospheric pressure.

3. In combination, electrical apparatus having a casing surrounding said apparatus, said casing containing a gas lighter than air for cooling said apparatus, and means within said casing for generating said gas, the rate of generation of gas being dependent upon the leakage of gas from said casing.

4. In combination, electrical apparatus having a casing surrounding said apparatus, said casing containing a gas lighter than air for cooling said apparatus, and an electrolytic gas generator for supplying gas to said casing, said electrolytic gas generator being responsive to the pressure of the gas within said casing.

5. In combination, electrical apparatus having a casing surrounding said apparatus, said casing containing hydrogen gas as a cooling medium, and means responsive to the pressure within said casing for generating hydrogen and supplying it to said casing.

6. In combination, electrical apparatus having a casing surrounding said apparatus, said casing adapted to contain a gas lighter than air as a cooling medium, and means for supplying such a gas to said casing and maintaining a pressure therein, at least slightly above atmospheric, comprising a U-tube having an electrolyte therein, an anode in one leg of said U-tube and a cathode in the other leg of said U-tube, the cathode leg of said U-tube communicating with the interior of said casing and the anode leg of said U-tube being exposed to the atmosphere.

In witness whereof, I have hereunto set my hand this 14th day of December, 1923.

ROBERT HANNAH.